(12) United States Patent
Jessen et al.

(10) Patent No.: US 7,953,397 B2
(45) Date of Patent: May 31, 2011

(54) METHOD FOR INFORMING A SUBSCRIBER OF A MOBILE TELEPHONY NETWORK ABOUT MISSED CALLS

(75) Inventors: Peter Jessen, Bonn (DE); Holger Weigang, Bonn (DE)

(73) Assignee: T-Mobile International AG & Co. KG, Bonn (DE)

( * ) Notice: Subject to any disclaimer, the term of this patent is extended or adjusted under 35 U.S.C. 154(b) by 696 days.

(21) Appl. No.: 11/972,448

(22) Filed: Jan. 10, 2008

(65) Prior Publication Data

US 2008/0188211 A1 Aug. 7, 2008

Related U.S. Application Data

(63) Continuation of application No. PCT/DE2006/001199, filed on Jul. 11, 2006.

(30) Foreign Application Priority Data

Jul. 12, 2005 (DE) .......................... 10 2005 032 811
Feb. 15, 2006 (DE) .......................... 10 2006 006 874

(51) Int. Cl.
*H04L 12/58* (2006.01)
*H04M 1/663* (2006.01)
*H04M 3/42* (2006.01)
*H04M 3/00* (2006.01)
*H04B 1/38* (2006.01)

(52) U.S. Cl. ..................... 455/415; 455/418; 455/414.1; 455/412.1; 455/412.2; 455/567

(58) Field of Classification Search .............. 455/68–69, 455/415, 417–420, 423–425, 435.1, 445, 455/458, 460–462, 466, 514, 517, 550.1, 551, 556.2, 561, 564–567, 410–411, 412.1–412.2, 413, 414.1, 422.1, 432.1, 432.3, 433–434, 456.1; 379/88.12, 100.06, 201.02, 207.15, 142.07, 179, 210.01, 215.01, 252, 263, 273.01, 88.19–88.24, 142.02, 142.04, 142.18; 719/318

See application file for complete search history.

(56) References Cited

U.S. PATENT DOCUMENTS

| | | | |
|---|---|---|---|
| 5,412,711 A | | 5/1995 | Hayashi |
| 5,809,128 A | * | 9/1998 | McMullin ................ 379/215.01 |
| 6,178,232 B1 | | 1/2001 | Latter et al. |
| 6,700,969 B1 | * | 3/2004 | Shaffer et al. ............ 379/211.01 |

(Continued)

OTHER PUBLICATIONS

International Search Report Dated Nov. 15, 2006.

*Primary Examiner* — Meless N Zewdu
(74) *Attorney, Agent, or Firm* — The Maxham Firm

(57) ABSTRACT

A method for informing a subscriber of a mobile telephony network about incoming calls while the mobile telephone of the subscriber is switched off or is not connected to the mobile telephony network. The notification takes place via the mobile telephone of the subscriber as soon as the mobile telephone has re-registered itself in the mobile radio network, and the message including at least the call number of the missed caller. In the event of a calling line identification restriction (CLIR) from the caller, a message is automatically produced and sent to the caller, by which means the caller is prompted, by a dialogue, to temporarily release the call number transmission for the call, such that the call number of the caller can be communicated to the subscriber.

7 Claims, 2 Drawing Sheets

U.S. PATENT DOCUMENTS

| | | |
|---|---|---|
| 6,748,058 B1 | 6/2004 | Schwend et al. |
| 6,748,068 B1 * | 6/2004 | Walsh et al. ............. 379/142.03 |
| 6,999,755 B2 * | 2/2006 | Park ............................ 455/414.1 |
| 7,324,638 B2 * | 1/2008 | Mullis et al. ............. 379/211.02 |
| 7,366,292 B2 * | 4/2008 | Tiliks et al. ............. 379/221.09 |
| 7,493,110 B2 * | 2/2009 | Jiang ............................ 455/418 |
| 2004/0141598 A1 * | 7/2004 | Moss et al. ................. 379/88.19 |
| 2005/0059384 A1 * | 3/2005 | Kuusinen et al. .......... 455/414.1 |
| 2005/0130632 A1 | 6/2005 | Park |
| 2006/0222152 A1 * | 10/2006 | Elias et al. ................. 379/88.13 |

* cited by examiner

METHOD FOR INFORMING A SUBSCRIBER OF A MOBILE TELEPHONY NETWORK ABOUT MISSED CALLS

FIELD OF THE INVENTION

The invention relates generally to a method for the notification of a mobile network subscriber on missed calls, and more particularly to such a method employing a computer program, the program code of which is executed on a computer of the network element of the mobile network.

DISCUSSION OF PRIOR ART

A text messaging information service for missed calls is known, and is offered, for example, in the D1 mobile network of T-Mobile Deutschland GmbH under the title "SMS Lost Calls." This information service operates whenever the mobile phone of a subscriber is turned off, or is in a dead spot, and no call forwarding, for example to the mobile box, has been activated. If the subscriber receives a call under these circumstances, the call is registered in the mobile network. As soon as the subscriber called turns his/her phone on again, he/she will be notified via text message on all calls missed during this time. Each caller number is preferably displayed only once in the text message. Each text message contains, for example, information on the last five callers, wherein each caller number is stored only temporarily. By nature the method works only if the caller transmits his/her telephone number, that is, has activated his/her calling line identification (CLI). If the caller has deactivated his/her calling line identification, the person receiving the call cannot be informed of the identity of the caller.

International patent publication WO 03/077570A1, discloses a method for the notification of a mobile network subscriber on a call received from a caller while the mobile phone of the subscriber is turned off, or while no connection to the mobile network existed. The notification is done via the mobile phone of the subscriber as soon as the mobile phone has again registered with the mobile network, wherein the message comprises at least the phone number of the missed call. The case of a deactivated calling line identification of the calling subscriber is not covered.

U.S. Pat. No. 6,748,068 B1 relates to a caller identification system, in which in case of a restricted calling line identification (CLIR: calling line identification restriction) on the part of the caller a message is automatically transmitted to the caller, by means of which the caller is requested to temporarily activate his/her calling line identification transmission for this call so that the phone number of the caller can be notified to the subscriber.

SUMMARY OF THE INVENTION

It is a purpose of the invention to provide a system for the notification of mobile network subscribers on missed calls, offering the possibility to also notify the subscriber on calls made by callers having calling line identification restriction.

The invention is based on an interactive control for communications between a mobile network subscriber and his/her mobile box. The interactive control is preferably based on a voice mail from the mobile box to the mobile phone of the subscriber, and a DTMF communication from the mobile phone of the subscriber to the mobile box. This interactive control preferably occurs before the through-connection of the connection, and the generation of charging records in the mobile switching center (MSC). This interaction can be utilized particularly in order to request the phone number in case of a restricted calling line identification of the calling subscriber, and then to establish a connection with charging records.

Until now, no interaction could be performed before the through-connection of a connection between an MSC and the mobile box, and therefore, no information exchange could take place. Such an interaction between the subscriber and the mobile box, however, is necessary, if an approval must be obtained from the subscriber, for example the transmission of the phone number, or establishing the connection with charging records.

According to one aspect of the invention the activity of the ISUP signaling between the MSC and the mobile box is modified. The ISDN user part (ISUP) is the ISDN-specific portion of the transmission of additional information via the signaling channel between switching locations. According to the invention it is necessary that the standard ISUP messages are modified by the subscriber, or by the mobile box, respectively, in chronological order. Further, it is necessary that parameters are set in the individual ISUP messages according to the interaction between the subscriber and the mobile box.

The notification to a subscriber can be performed under conditions of CFNREACH (call forwarding not reachable), CFBUSY (call forwarding busy), and CFNREPLY (call forwarding no reply).

The method according to the invention can be realized preferably as a computer program, the program code of which is executed on a computer of the network element of the mobile network.

BRIEF DESCRIPTION OF THE DRAWING

The call and signaling activities of a preferred embodiment of the invention are explained in further detail by the following detailed description, when read in conjunction with the drawing, wherein.

DETAILED DESCRIPTION OF THE PREFERRED EMBODIMENTS

As the base situation it is assumed that a caller, for example, a subscriber of a public communication network, wishes to reach another subscriber, for example, a subscriber of a mobile network, hereinafter also referred to as the person to be called. For this purpose, the caller dials the phone number of the person to be called.

Figure 1:
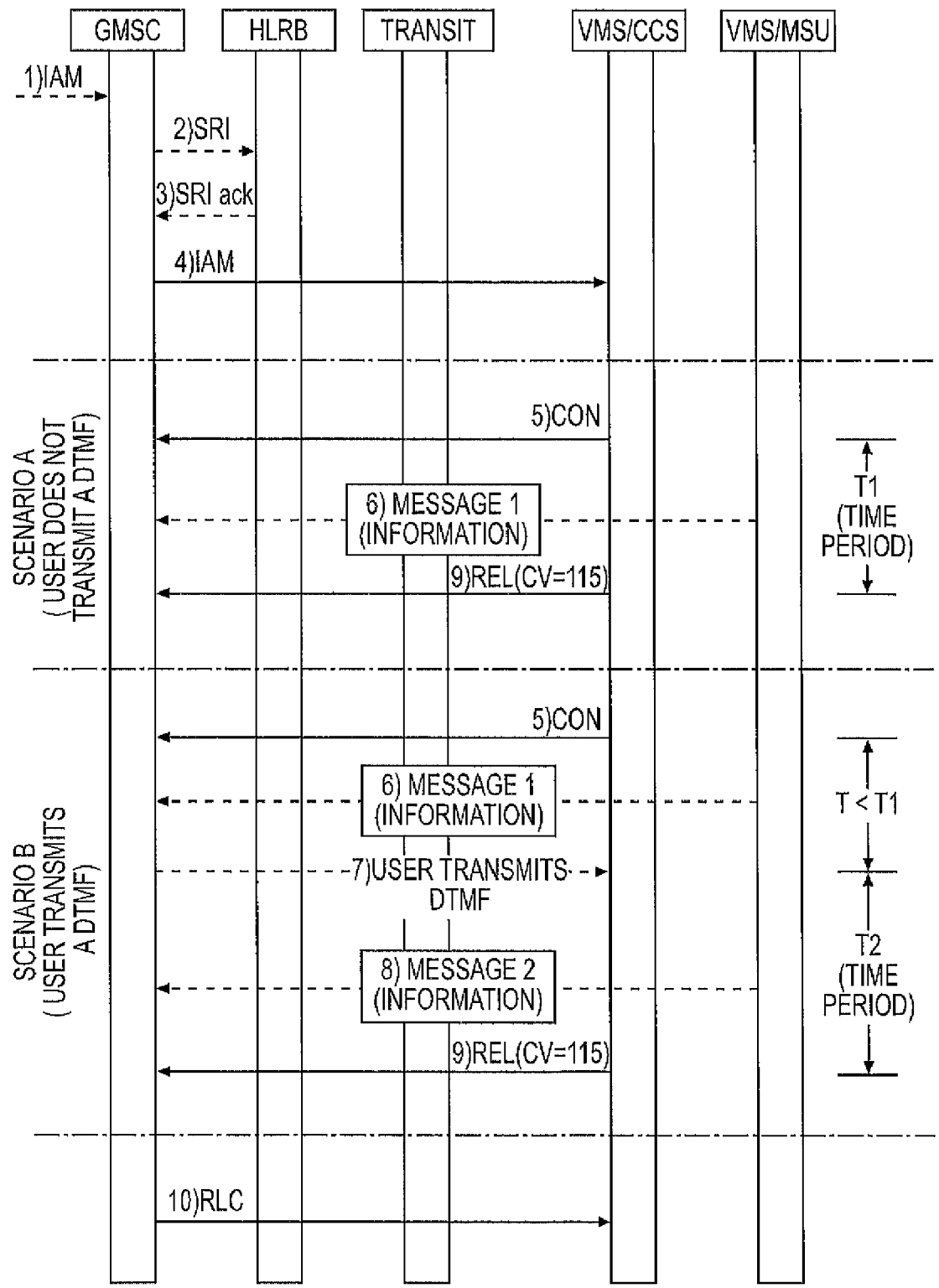
FIG. 1 is a functional diagram of an embodiment of the invention.

According to FIG. 1, in a first step 1) the call request is received at the appropriate (transitional) switching center (GMSC: gateway mobile switching center) in the form of an IAM message (initial address message). Among other things, the IAM message ensures that an information channel is switched for the desired call service, and it contains information on the service, the characteristic of the information channel, and on the service properties. Among other things, the IAM message contains the mobile phone number MSISDN of the person to be called, which is comprised of a country code (CC), a national destination code (NDC), and a subscriber number (SN). The MSISDN is analyzed by the switching center. The caller can be either a subscriber of a landline (STN/ISDN), or of a mobile network (PLMN).

According to steps 2) and 3) the following routing procedure is now performed for the call: the switching center GMSC transmits a so-called SRI (send routing information)

message to the home registry HLRB of the subscriber to be called. The SRI message is a MAP message, which the switching center transmits to the home registry HLRB of the person to be called in order to obtain the respective routing information, for example, the location of the person to be called, in order to be able to forward a call request to the desired subscriber to be called. In the assumed case, the subscriber to be called has his mobile phone turned off, or has no connection to his/her mobile network. This circumstance is known to the home registry HLRB. For example, the subscriber to be called has his/her mobile phone turned off. Further, it is known (detach/attach status) that the subscriber to be called in case of the "non-availability" has not activated his/her mobile box (call answering function) so that the caller is also not able to leave a message on the mobile box. Since the subscriber to be called does not answer, and also has not activated call forwarding to the mobile box, the HLRB recognizes the state: "call forwarding not reachable" (CFN-REACH), call forwarding when not reachable.

The call is switched through at the CFNR, if the person to be called does not answer. This service characteristic allows the operator to forward the call, if the subscriber is not logged in (detached). In this case, the HLRB responds to the switching center GMSC with an SRI acknowledge message, in which a general phone number for call forwarding (CFD FTNO: call forwarding forwarded to No.) is contained, to which the call is to be forwarded (for example "0" NDC "CC" 12345678) with NDC=national destination code, CC=not dialable symbol "C" twice, so that a customer is not able to dial the service himself/herself, and for detecting the service at the voice mail system VMS/CCS. The switching center GMSC now performs call forwarding to this FTNO phone number. The respective phone number for call forwarding must first be determined in a respective routing database. The received number "0" NDC "CC" 12345678 is now transmitted in the SRI message to the HLRB. This number belongs to a voice mail system VMS/CCS. After the HLRB has received the SRI message with the special MSISDN, that is, the mobile box number mentioned above, it calculates the routing address of the subscriber's own voice mail system in dependency of the national code NDC and according to the MNP (mobile number portability) concept. The HLRB finds an address of the voice mail system VMS/CCS.

In step 4) the mobile switching center GMSC now transmits an JAM message to the voice mail system of the subscriber: the JAM message contains the address (phone number) of the calling subscriber (A), the address of the subscriber to be called (MS B), and the re-addressed address of the voice mail system of the person to be called CVMS/CCS. The voice mail system VMS/CCS extracts the A and MS B numbers, and stores the A number of the caller in a database entry of the MS B number. The voice mail system VMS/CCS identifies the state that the calling subscriber A has restricted (CLIR) his/her caller line identification (CLI). If the CLI of the caller is not available, the voice mail system deletes the call, and ends the connection to the caller using a special release cause.

According to the invention, in case of a restricted CLI, a confirmation message (connect message, or CON message) is now transmitted according to step 5) to the GMSC, and the charging of the call is started in the MSC.

Now a voice mail system, VMS/MSU, that is established especially for the service according to the invention, is activated, and by means of a special voice message according to step 6) the calling subscriber A is now notified and requested to temporarily release the transmission of his/her CLI for this call. For this purpose, he/she is requested by the VMS/MSU to perform this release by means of activating a respective sequence of keys on the mobile phone. The sequence of keys entered by the subscriber is transmitted back to the voice mail system VMS/MSU by means of the two-tone method. In case the A subscriber does not transmit a response, that is, does not allow the offered transmission of his/her phone number, the call is ended after a preset time period T1. At this point, the process is continued with step 9), and a release message is transmitted from the subscriber's own voice mail system VMS/CCS to the switching center GMSC to end the connection. In this case the GMSC responds according to step 10) with an RLC message, and confirms the ending of the call.

However, if the calling subscriber agrees with a temporary transmission of his/her phone number for this call, he/she can, according to step 7), perform a confirmation of the phone number transmission by activating a DTMF sequence of keys within the time period T1. The DTMF message is transmitted to the special voice mail system VMS/MSU.

In step 8), in an optional second message transmitted by the special voice mail system VMS/MSU to the subscriber, the successful transmission of his/her phone number is confirmed. The voice mail system VMS/CCS of the subscriber is not able to identify the caller by means of the phone number transmitted, and to notify the person to be called of the missed call called by means of displaying the phone number of the caller. The call is now ended according to steps 9) and 10) described above.

Figure 2:
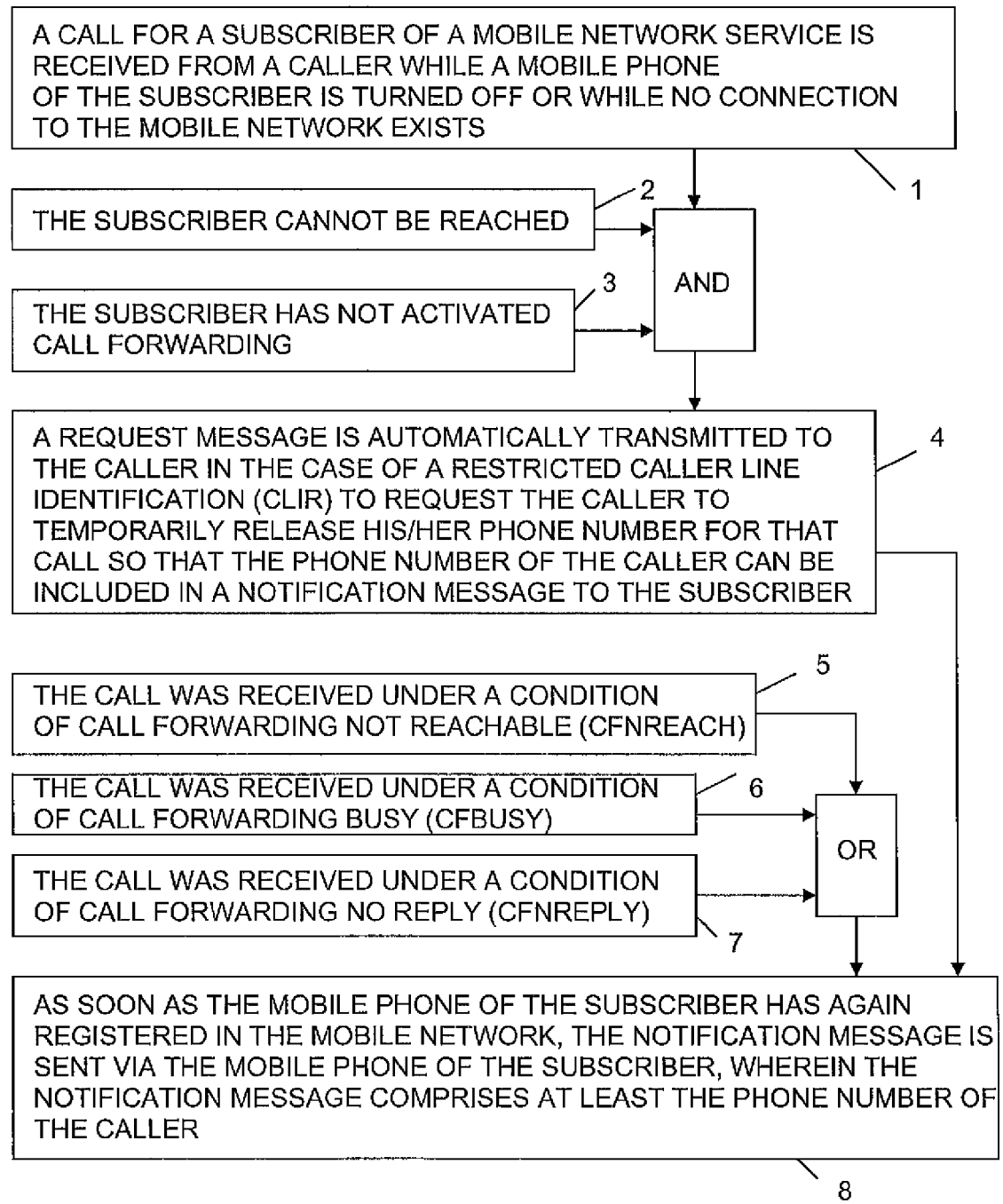
FIG. 2 is a flow diagram of an embodiment of the invention.

Referring to FIG. 2, when (1) a call for a subscriber of a mobile network service is received from a caller while a mobile phone of the subscriber is turned off or while no connection to the mobile network exists; (2) the subscriber cannot be reached; and (3) the subscriber has not activated call forwarding, (4) a request message is automatically transmitted to the caller in the case of a restricted caller line identification (CLIR) to request the caller to temporarily release his/her phone number for that call so that the phone number of the caller can be included in a notification message to the subscriber.

When the call was received under (5) a condition of call forwarding not reachable (CFNREACH), (6) a condition of call forwarding busy (CFBUSY), or (7) a condition of call forwarding no reply (CFNREPLY), (8) as soon as the mobile phone of the subscriber has again registered in the mobile network, the notification message is sent via the mobile phone of the subscriber, wherein the notification message comprises at least the phone number of the caller

What is claimed is:

1. A system for notifying a subscriber of a mobile network service of a call received from a caller while a mobile phone of the subscriber was turned off, or while no connection to the mobile network existed, wherein the notification message occurs via the mobile phone of the subscriber as soon as the mobile phone has again registered in the mobile network, and the notification message comprises at least the phone number of the caller, the system comprising:

means for automatically transmitting a request message to the caller in the case of a restricted caller line identification (CLIR) to request the caller to temporarily release his/her phone number for the received call so that the phone number of the caller can be included in the notification message to the subscriber;

wherein said request message is transmitted to the caller when the subscriber cannot be reached and has not activated call forwarding; and means for performing the notification to a said subscriber under conditions of call forwarding not reachable (CFN- REACH), call forwarding busy (CFBUSY), or call forwarding no reply (CFNREPLY).

2. The system according to claim 1, wherein said request message is transmitted to the caller via voice message.

3. The system according to claim 1, wherein said request message is transmitted to the caller via a text message.

4. The system according to claim 1, wherein the transmission of said request message and interaction with the caller are performed by means of a voice mail system, or a server.

5. The system according to claim 1, wherein the caller communicates with a voice mail system via DTMF signaling on his/her mobile phone, thereby temporarily releasing the CLIR.

6. The system according to claim 4, wherein the caller communicates with the voice mail system via DTMF signaling on his/her mobile phone, thereby temporarily releasing the CUR.

7. A non-transitory computer readable storage medium for use with a computer in a system for notifying a subscriber of a mobile network service of a call received from a caller while a mobile phone of the subscriber was turned off, or while no connection to the mobile network existed, wherein a notification message occurs via the mobile phone of the subscriber as soon as the mobile phone has registered in the mobile network, and the notification message comprises at least a phone number of the caller, wherein the non-transitory computer readable storage medium contains computer executable program instructions for causing the computer to implement the steps of:

automatically transmitting a request message to the caller in the case of a restricted caller line identification (CLIR) to request the caller to temporarily release his/her phone number for the received call so that the phone number of the caller can be included in the notification message to the subscriber;

wherein said request message is transmitted to the caller when the subscriber cannot be reached and has not activated call forwarding; and performing the notification to a said subscriber under conditions of call forwarding not reachable (CFNREACH), call forwarding busy (CFBUSY), or call forwarding no reply (CFNREPLY).

\* \* \* \* \*